United States Patent
Vishik

(10) Patent No.: US 9,165,152 B2
(45) Date of Patent: *Oct. 20, 2015

(54) SECURE NON-INVASIVE METHOD AND SYSTEM FOR DISTRIBUTION OF DIGITAL ASSETS

(71) Applicant: IBM International Group BV, Amsterdam (NL)

(72) Inventor: Claire Svetlana Vishik, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/026,428

(22) Filed: Sep. 13, 2013

(65) Prior Publication Data
US 2014/0013113 A1   Jan. 9, 2014

Related U.S. Application Data

(63) Continuation of application No. 11/403,078, filed on Apr. 12, 2006, now Pat. No. 8,565,424.

(51) Int. Cl.
*G06F 21/00* (2013.01)
*G06F 21/62* (2013.01)
*G06F 21/10* (2013.01)
(Continued)

(52) U.S. Cl.
CPC ............ *G06F 21/6209* (2013.01); *G06F 21/10* (2013.01); *H04L 63/08* (2013.01); *H04N 21/454* (2013.01); *H04N 21/4532* (2013.01); *H04L 63/0428* (2013.01); *H04L 63/0853* (2013.01); *H04L 63/0861* (2013.01); *H04L 2463/101* (2013.01)

(58) Field of Classification Search
CPC ...................................................... G06F 21/10
USPC .................................................. 380/201, 200
See application file for complete search history.

(56) References Cited

U.S. PATENT DOCUMENTS

| 5,673,316 A | 9/1997 | Auerbach et al. |
| 6,418,421 B1 | 7/2002 | Hurtado et al. |

(Continued)

FOREIGN PATENT DOCUMENTS

| WO | 0214990 A1 | 2/2002 |
| WO | WO 0214990 A1 * | 2/2002 |

OTHER PUBLICATIONS

International Search Report and Written Opinion of the International Searching Authority for International Application No. PCT/US07/07630 from the International Searching Authority, mailed on Feb. 7, 2008, 10 pages.

(Continued)

*Primary Examiner* — Mohammad L Rahman
(74) *Attorney, Agent, or Firm* — Toler Law Group, P.C.

(57) ABSTRACT

A client computer system receives a file that is at least partially encrypted. The client computer also receives a file manager and user input. In response to the user input matching data stored in an encrypted user profile, the client computer uses the file manager to decrypt the file based on a key stored in the encrypted user profile. The file is unusable if copied to another client computer, and the file manager manages usage of the file based on one or more terms of usage.

19 Claims, 6 Drawing Sheets

(51) Int. Cl.
*H04N 21/45* (2011.01)
*H04N 21/454* (2011.01)
*H04L 29/06* (2006.01)

(56) References Cited

U.S. PATENT DOCUMENTS

| | | | |
|---|---|---|---|
| 6,546,016 | B1 | 4/2003 | Gerszberg et al. |
| 6,831,982 | B1 | 12/2004 | Hughes et al. |
| 6,948,104 | B2 | 9/2005 | Herley et al. |
| 7,213,005 | B2 * | 5/2007 | Mourad et al. ............... 705/64 |
| 7,281,274 | B2 * | 10/2007 | Manning et al. ............... 726/31 |
| 7,644,443 | B2 | 1/2010 | Matsuyama et al. |
| 7,681,034 | B1 * | 3/2010 | Lee et al. ............... 713/164 |
| 7,702,590 | B2 | 4/2010 | Malik |
| 7,788,339 | B1 | 8/2010 | Srinivasan |
| 7,908,477 | B2 * | 3/2011 | Eto ............... 713/165 |
| 2002/0016922 | A1 | 2/2002 | Richards et al. |
| 2002/0067498 | A1 | 6/2002 | Chapman |
| 2004/0103303 | A1 | 5/2004 | Yamauchi et al. |
| 2004/0205028 | A1 | 10/2004 | Verosub et al. |
| 2004/0268230 | A1 | 12/2004 | Liu et al. |
| 2005/0022227 | A1 | 1/2005 | Shen et al. |
| 2005/0027715 | A1 | 2/2005 | Casey et al. |
| 2005/0132083 | A1 | 6/2005 | Raciborski et al. |
| 2005/0198061 | A1 | 9/2005 | Robinson et al. |
| 2005/0219640 | A1 | 10/2005 | Kasatani |
| 2006/0136453 | A1 | 6/2006 | Kwan |
| 2007/0083467 | A1 | 4/2007 | Lindahl et al. |
| 2007/0242824 | A1 | 10/2007 | Vishik |

OTHER PUBLICATIONS

Jun, S. et al., "Incentives in BitTorrent Induce Free Riding", P2PECON '05 Proceedings of the 2005 ACM SIGCOMM workshop on Economics of peer-to-peer systems, 2005, ACM, New York, New York, USA, pp. 116-121.

Liu, Q. et al., "Digital Rights Management for Content Distribution", ACSW Frontiers '03 Proceedings of the Australasian information security workshop conference on ACSW frontiers 2003, 2003, vol. 21, Australian Computer Society, Inc., Darlinghurst, Australia, pp. 49-58.

\* cited by examiner

SECURE NON-INVASIVE METHOD AND SYSTEM FOR DISTRIBUTION OF DIGITAL ASSETS

CLAIM OF PRIORITY

This application is a continuation patent application of, and claims priority from, U.S. patent application Ser. No. 11/403,078, filed on Apr. 12, 2006 and entitled "Secure Non-Invasive Method and System for Distribution of Digital Assets," which is incorporated by reference herein in its entirety for all purposes.

FIELD OF THE DISCLOSURE

The present disclosure is generally related to methods and systems for distributing digital assets and enforcing rights on the digital assets.

BACKGROUND

The advent of the Internet has made protection of intellectual property a priority for software and digital media providers. As bandwidth has become more plentiful, the Internet has been used for unauthorized downloading of music, movies and pirated copies of software. This misuse has led to loss of revenues for software and media producers.

Similar distribution challenges are associated with delivery of classified and confidential information. Organizations may wish to limit activities that employees can perform using confidential documents and applications.

To mitigate unauthorized downloading and copying of the digital assets, some methods and systems for protecting digital assets have emerged. Available methods and systems include encryption infrastructure solutions, viewer lockup solutions, and Digital Rights Management (DRM) solutions.

Encryption infrastructure solutions typically require a corresponding proprietary plug-in for each application, including databases and file systems, to guarantee enforcement. Thus, an end user may be required to install multiple proprietary plug-ins in his/her computer to handle multiple applications. Encryption infrastructure solutions typically use a public key infrastructure (PKI) to manage public keys for encryption. Encryption infrastructure solutions are relatively difficult and expensive to deploy and maintain.

Viewer lockup solutions use a plug-in to lock information in a viewer program. For each viewer program that is to display or otherwise output digital assets, a corresponding plug-in is required. Thus, an end user may need multiple viewer lockup solutions in his/her computer to handle multiple viewer programs.

DRM solutions, which are usually embedded in an application or are otherwise application-specific, enable an administrator to regulate downloads and usage of digital assets. Existing standards to support digital rights include extensible rights markup language (XrML) and open digital rights language (ODRL). However, implementations based on existing standards are usually proprietary.

Online distributors of computer gaming software may attempt to make copying and reuse of their software difficult by decomposing the software into components. This approach may be undesirably expensive and limiting to an inventory of products.

In some broadcasting applications, owners' rights are preserved in hardware that may contain a proprietary scrambling algorithm. In this case, users who wish to receive the broadcasts may be required to buy or otherwise acquire receivers produced by a certain hardware maker. This limits consumer choices and availability of services.

Shortcomings of the aforementioned methods and systems include their limitation to a particular application or a particular type of digital asset, their being too invasive by requiring a user to install or configure a client program to enforce the protection of the digital assets, and/or their being excessively complex to provide a reliable solution. Further, the client program to enforce the protection of the digital assets may not be successful because this enforcement is more important to enforcers than end users. Still further, many digital rights enforcement systems are resource-intensive and costly.

DETAILED DESCRIPTION OF THE DRAWINGS

Disclosed herein are embodiments of a digital asset and media distribution method and system. Embodiments support administrator-configurable, rights-enforcing downloads of digital assets to client workstations. A central server serves the client workstations by providing user registration, subscription and management features of the media distribution system. Various examples of digital assets, such as music, movies or electronic books to consumers, secret documents for government employees or fingerprints to authorized law enforcement authorities, can be distributed to client workstations of registered users. Although not discussed in detail herein, embodiments of the method and system can be used in multi-device environments.

Non-transferable usage rights of a digital asset are enforced on a client workstation without installing an additional plug-in to the client workstation. Multiple authentication methods, such as user identifiers, passwords, smart cards, biometrics or any combination thereof, may be used to authenticate a user of the client workstation before enabling the user to use the digital asset. The usage rights may comprise a usage period that, when expired, causes deletion or termination of access to a downloaded digital asset. The digital assets may be downloaded to a client workstation in a partially encrypted form to be made unusable if copied to another client workstation.

The embodiments provide portable, non-invasive and broadly-deployable solutions for distributing digital assets and enforcing rights associated therewith. In addition, embodiments of the solutions described herein are easy to distribute, facilitate ease in defining rights in the form of rules such as an expiration date or a use restriction, are application-independent by enforcing rights on downloaders and data instead of inside applications, can be adapted for multiple environments (e.g. from consumer applications to high-security government communications), are applicable to any or substantially any file format, do not require a special infrastructure other than a standard operating system on a client side, use an encryption approach that minimizes or otherwise reduces overhead for larger files such as movie files, can use multiple authentication methods (e.g. smart cards, biometric, passwords) and multiple levels of authentication (e.g. from simple to sophisticated), can have a client-server modular architecture, and can have centralized account management to manage downloads of assets, payments, billing and auditing. Thus, embodiments of the solutions may be both lightweight and universal.

Figure 1:
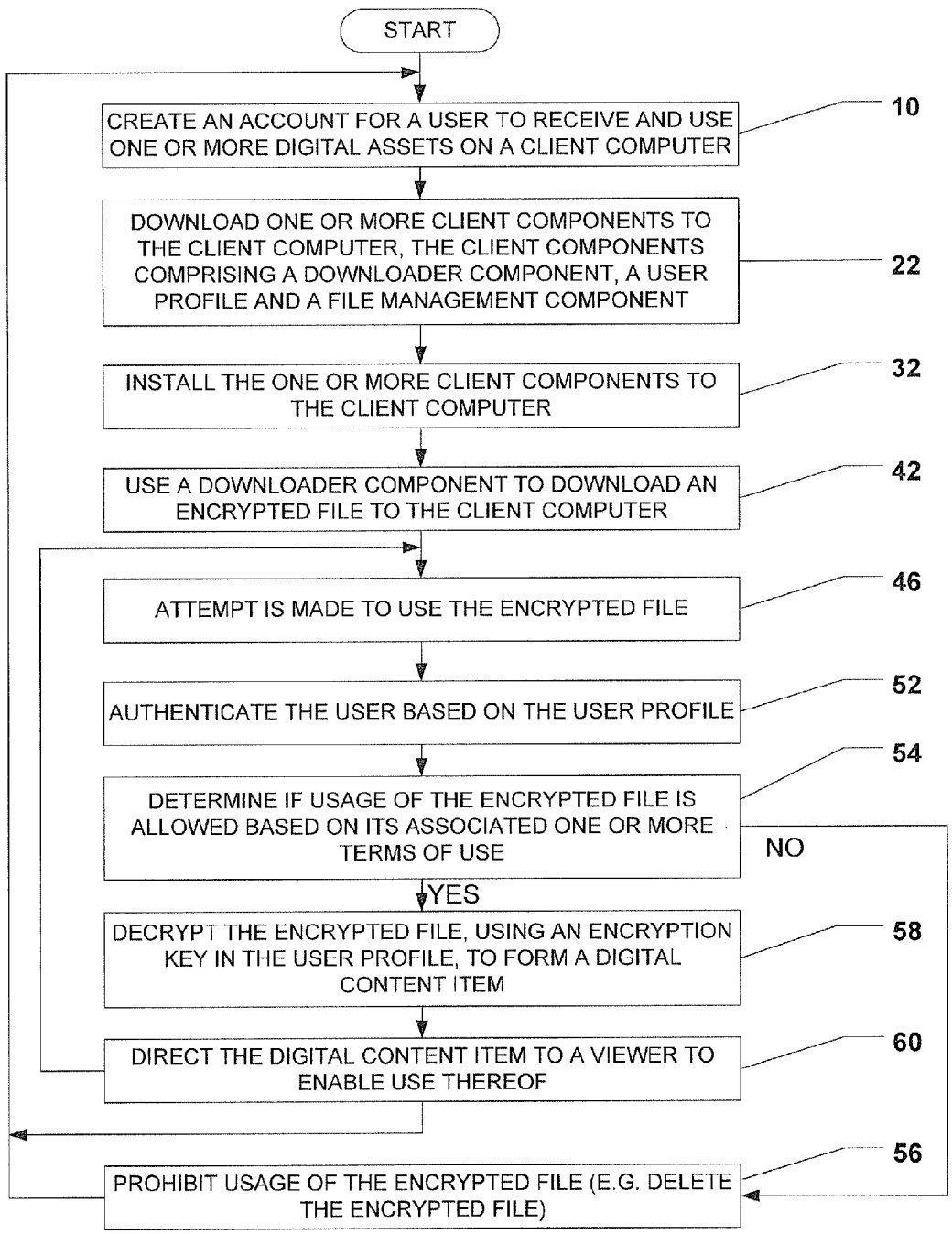
FIG. 1 is a flow chart of an embodiment of a method to distribute digital assets and enforce rights associated with the digital assets.
Figure 2:
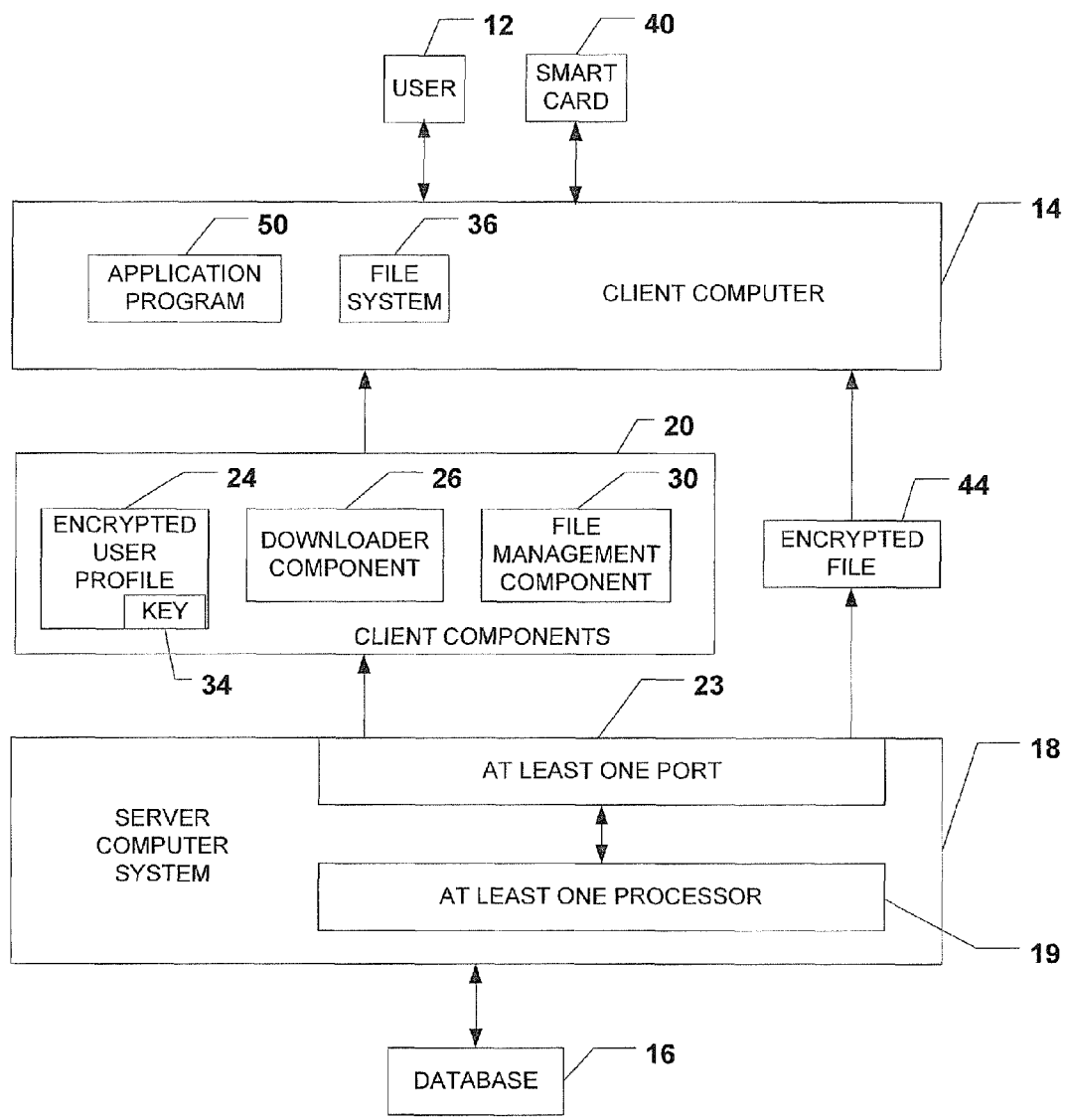
FIG. 2 is a block diagram of an embodiment of a system to distribute digital assets and enforce rights associated with the digital assets.

Embodiments are described with reference to FIGS. 1 and 2 which show embodiments of a method and system, respectively, to distribute digital assets and enforce rights associated with the digital assets. As indicated by block 10, a user 12 uses a client computer 14 to create an account for receiving and using one or more digital assets. The user 12 may enter or select parameters that limit the usage of the account. For example, the account may have a limited number of downloads associated therewith, and/or a limited time period (e.g. a limited number of days) that the account is to be active. The user 12 may enter payment information associated with the account so that the user 12 can be charged for downloads. The information associated with the account is stored in a database 16 of a server computer system 18 whose operation is directed by at least one processor 19. In addition to user registration management, the server computer system 18 can perform content subscription acts.

Although the herein description is made with reference to a single user at a single client computer, the method and system can be used for multiple users at multiple different client computers.

After the account has been successfully created, one or more client components 20 are downloaded to the client computer 14 as indicated by block 22. For example, after determining that the account is successfully created, the server computer system 18 may automatically redirect the client computer 14 to a download page at which the one or more client components 20 can be downloaded by the user 12. The server computer system 18 outputs the one or more client components 20 to the client computer 14 from at least one port 23 via a computer network. Examples of the computer network include, but are not limited to, the Internet, an intranet and an extranet. The one or more client components 20 may comprise an encrypted user profile 24, a downloader component 26 and a file management component 30.

As indicated by block 32, the one or more client components 20 are installed to the client computer 14. The one or more client components 20 are used by the client computer 14 to subsequently download and use digital assets in accordance with the account.

The downloader component 26 is used by the client computer 14 to subsequently download encrypted versions of digital assets, such as encrypted files. Examples of the digital assets are numerous. Specific examples of the digital assets include, but are not limited to, music, movies, secret documents, confidential documents, and fingerprints. In an embodiment, the downloader component 26 comprises a Java engine. The files may be encrypted using partial encryption or striped encryption so that large amounts of data, such as in a digital movie file, can be protected without significant overhead. In some environments where higher security is desired, the files may be fully encrypted.

The encrypted user profile 24 contains one or more encryption keys 34 for decrypting the encrypted digital assets that were downloaded by the downloader component 26. The encrypted user profile 24 for the user 12 can be stored in a file system 36 of the client computer 14. Alternatively, the encrypted user profile 24 can be stored in a smart card 40 or an alternative computer-readable storage medium that is removable from the client computer 14. The encrypted user profile 24 may be stored in the file system 36 if the user 12 elects not to issue the smart card 40. The one or more encryption keys 34 may be usable in response to the user 12 entering a valid user identifier and/or passcode to the client computer 14, and/or in response to a detecting particular biometric feature(s) of the user 12. For example, the user 12 may submit a fingerprint when enrolling in the system. The fingerprint is usable to unlock the encrypted user profile 24 from either the file system 36 or the smart card 40.

The file management component 30 uses any of the encryption keys 34 in the user profile 24 to decrypt the encrypted digital assets downloaded by the downloader component 26 to produce a digital content item. The file management component 30 makes the digital content item usable by the client computer 14 when usage is allowed based on one or more terms associated with the digital content item. The terms may be based on a limited number of uses, a limited usage period, limitations on sharing the digital content item with other users, or any combination thereof. For example, consider the user 12 being a support consultant and the digital content item being a customer's confidential financial document. In this example, the terms may permit the support consultant to open the customer's confidential financial document only once (or alternatively, another limited number of times). In another example, consider the user 12 being a government employee and the digital content item being a confidential report. In this example, the terms may give the government employee access to the confidential report, but prohibit the government employee from emailing or otherwise sharing the confidential report (or alternatively, limit to whom the confidential report can be shared).

As indicated by block 42, the downloader component 26 is used to download an encrypted file 44 to the client computer 14. In an embodiment, the downloader component 26 is usable by the client computer 14 to download only the encrypted file 44 and optionally at least one component associated with the encrypted file 44. The server computer system 18 cooperates with the downloader component 26 to output the encrypted file 44 to the client computer 14 via the computer network. The encrypted file 44 is stored, at least temporarily, by the client computer 14 or a computer-readable medium associated therewith. The encrypted file 44 may be stored in the file system 36.

As indicated by block 46, either the user 12 or another user attempts to use the encrypted file 44. The attempt to use the encrypted file 44 may be within the context of an application program 50. However, the terms of usage of the encrypted file 44 are not enforced inside the application program 50, but rather by the file management component 30.

As indicated by block 52, an act of authenticating the user 12 may be required before the encrypted file 44 is made usable. The user 12 can be authenticated by entering a user identifier and/or passcode that is the same as that stored in encrypted user profile 24 (e.g. from either the smart card 40 or the file system 36). Either as an alternative to or in addition to the user identifier/passcode, one or more biometric features of the user 12 may be required to authenticate the user. For example, the user profile 24 stored on the smart card 40 may be unlocked based on a fingerprint of the user 12 being validated. Although different methods of authentication can be used, this disclosure focuses on strong or multi-factor authentication. For example, the multiple factors can include a personal identification number (PIN) and a password, or a PIN and a biometric identifier. The following acts presume that the user 12 has been successfully authenticated.

As indicated by block 54, the file management component 30 determines if usage of the encrypted file 44 is allowed based on its associated one or more terms. In an embodiment, the file management component 30 is usable by the client computer 14 to manage usage of only the encrypted file 44 and optionally at least one component associated with the encrypted file 44.

If usage of the encrypted file 44 is disallowed based on its associated one or more terms, the encrypted file 44 is prohibited from being used by the client computer 14, as indicated by block 56. The file management component 30 may automatically delete the encrypted file 44 upon determining that its usage is disallowed. Alternatively, the file management component 30 may terminate access to the encrypted file 44 (e.g. by disallowing decryption thereof) upon determining that its usage is disallowed.

If usage of the encrypted file is allowed, the client computer 14 decrypts the encrypted file 44 using one or more of the encryption keys 34 in the user profile 24, as indicated by block 58. In an embodiment, the user profile 24 is usable by the client computer 14 to decrypt only the encrypted file 44 and optionally at least one component associated with the encrypted file 44. Once decrypted, a resulting digital content item is directed to a viewer to enable the user 12 to use the digital content item, as indicated by block 60. For example, the digital content item can be directed to the application program 50 to enable the application program 50 to use the digital content item. Although the encrypted file 44 is stored by the file system 36, the decrypted digital content item is not stored as a file in the file system 36. This mitigates a potential for unauthorized use of copies of the encrypted file 44.

Flow of the method can return to block 46 to process one or more subsequent attempts to use the encrypted file 44. Those of the subsequent attempts that are allowed by the usage terms associated with the encrypted file 44 result in making the encrypted file 44 usable to the user 12. The encrypted file 44 is made unusable if its usage is not allowed based on the usage terms.

Flow of the method can return to block 10 to process one or more subsequent downloads of one or more other encrypted files. In general, the terms of usage for a subsequent download may be either the same as or may differ from the download of the encrypted file 44. The above-described acts are repeated for downloading, decrypting, using, and enforcing the terms of usage on the one or more other files. Some or all of the client components 20 that were downloaded for the encrypted file 44 are associated with and usable only with the encrypted file 44 and not with the one or more other encrypted files. Thus, for each subsequent digital asset that is to be downloaded as a subsequent encrypted file, any combination of a subsequent user profile, a subsequent downloader component, and a subsequent file management component may be generated and downloaded to the client computer 14. The subsequent user profile, the subsequent downloader component, and the subsequent file management component are usable only with its associated subsequent encrypted file.

In the aforementioned embodiment, the client computer 14 stores the downloaded objects (e.g. including the encrypted file 44) at least temporarily, and also stores information about its use, user(s), user rights and connections. In alternative embodiments, some or all of the functionality executed on the client computer 14 can be performed by a server gateway. These alternative embodiments may be used in situations where storing confidential information, including authentication and credential validation information, on the client computer 14 is not possible or not desirable.

Further in the aforementioned embodiment, the downloader component 26 is a proprietary downloader, that includes scripts and configuration files to regulate partial encryptions of the encrypted file 44 and elimination of the file after a usage period has ended, to provide an additional security feature. In alternative embodiments, a standard downloading protocol such as file transfer protocol (FTP) may be used with a generic downloader.

Figure 3:
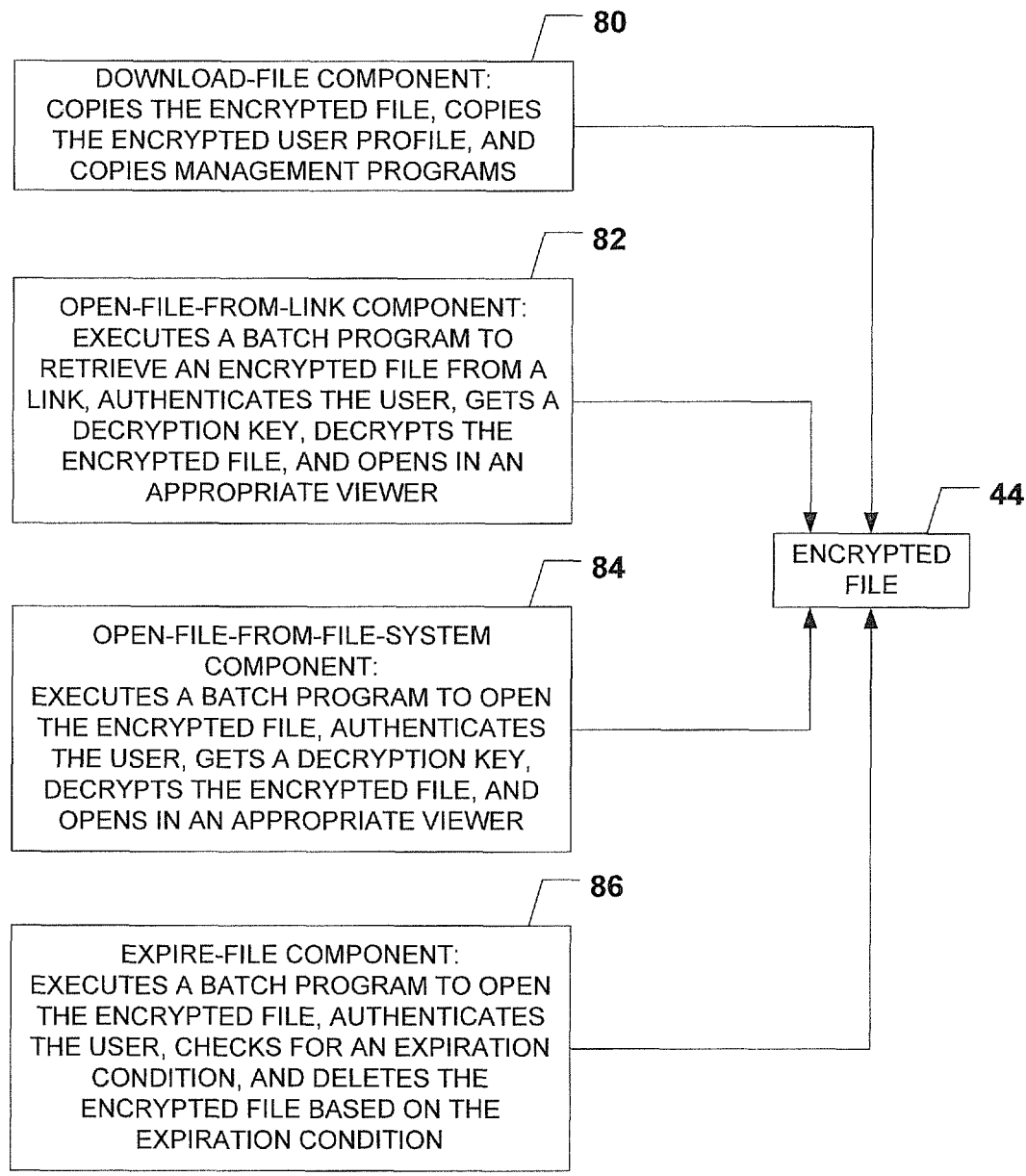
FIG. 3 is a block diagram of file management features associated with each downloadable file.

FIG. 3 is a block diagram of file management features associated with each downloadable file. A download-file feature 80 comprises copying an encrypted file, an encrypted profile and one or more file management programs from the server computer system 18 to the client computer 14. An open-file-from-link feature 82 comprises executing a batch program to open the encrypted file from a link (e.g. a hyperlink), authenticating the user 12, getting a decryption key based on said authenticating, decrypting the encrypted file based on the decryption key, and opening the file in an appropriate viewer program. An open-file-from-file-system feature 84 comprises executing a batch program to open the encrypted file stored in the file system 36, authenticating the user 12, getting a decryption key based on said authenticating, and opening the file in an appropriate viewer program. An expire-file feature 86 comprises executing a batch program to open the encrypted file, authenticating the user 12, checks a time stamp, and deletes the encrypted file if the usage of the encrypted file has expired based on the time stamp.

Figure 4:
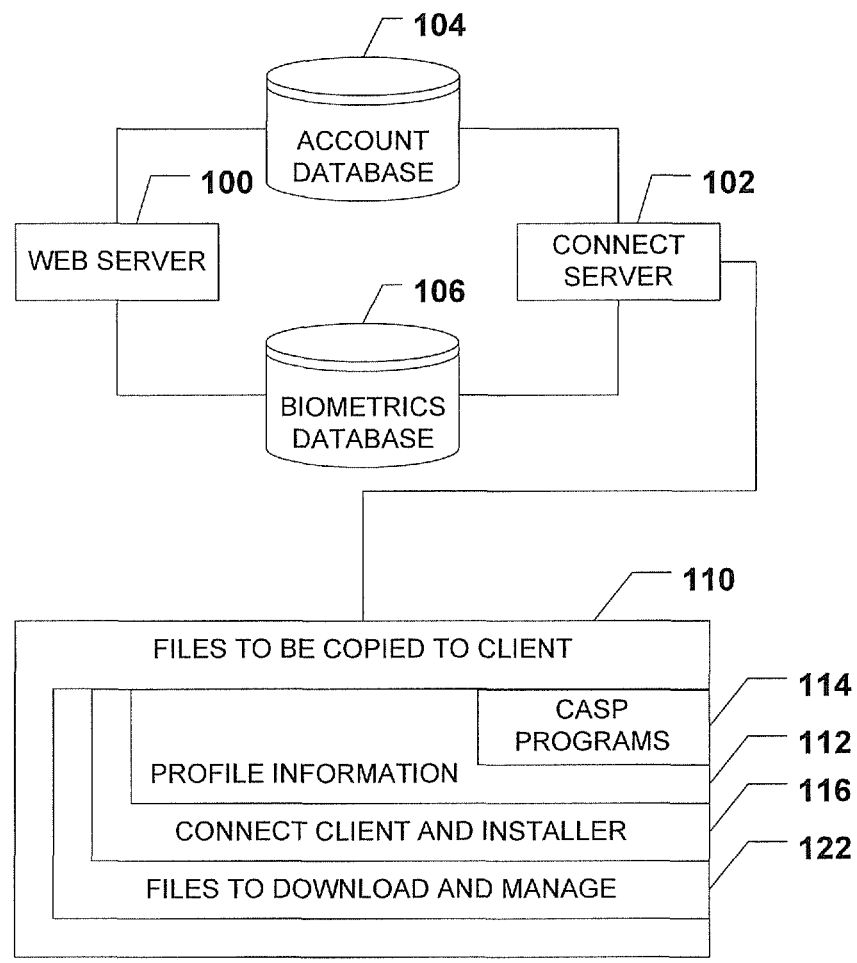
FIG. 4 is a block diagram of an embodiment of components of a server computer system.

FIG. 4 is a block diagram of an embodiment of components of the server computer system 18. The server computer system 18 comprises a Web server 100. In an embodiment, the Web server 100 comprises an IIS 5.x server. The server computer system 18 further comprises a connect server 102 having server-side components to interact with components installed at the client-side. An account database 104 stores user records as computer-readable data encoded on computer-readable media. An enrollment database 106 stores user biometric information as computer-readable data encoded on computer-readable media. The server computer system 18 further comprises files 110 that are to be copied to the client computer 14 during installation. The files 110 comprise an encrypted customer profile 112, file management programs 114, and an installer program 116. The server computer system 18 further comprises files 122 that are to be downloaded to the client computer 14 after installation of the files 110. The files 122 are downloaded to the client computer 14 according to a subscription associated with the client computer 14 or its user.

Figure 5:
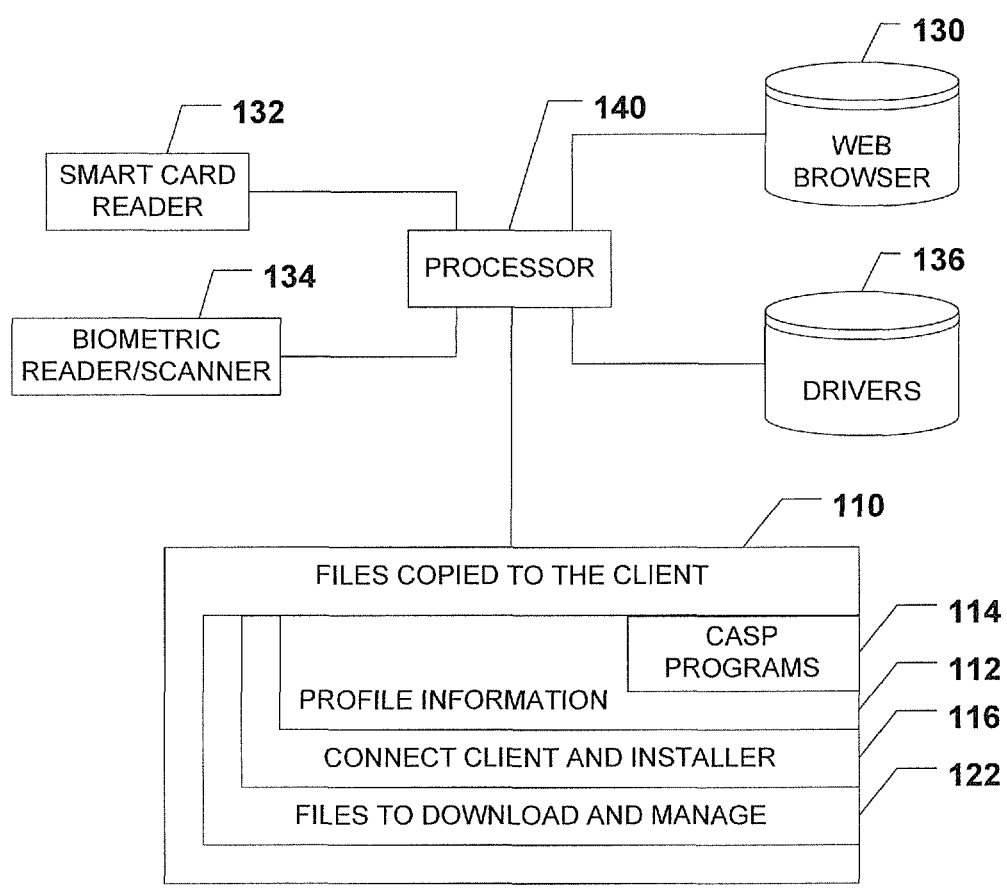
FIG. 5 is a block diagram of an embodiment of components of a client computer.

FIG. 5 is a block diagram of an embodiment of components of the client computer 14. The embodiment may use an NDM protocol that is initiated and controlled from a Web browser 130 of the client computer 14. Although illustrated to use ActiveX objects, non-ActiveX embodiments are also within the scope of this disclosure. The client computer 14 comprises the files 110 downloaded from the server computer system 18. The client computer 14 may use a smart card reader 132 and/or a biometric reader/scanner 134 to authenticate the user 12 and thus permit use of the downloaded files 122. Once the user 12 is authenticated, the files 122, which are downloaded as encrypted files (e.g. .enc files), can be opened with the file management programs 114. The client computer 14 may use one or more drivers 136 to enable use of the files 122. A processor 140 directs the cooperation between the aforementioned elements.

For purposes of illustration and example, consider an embodiment of the method and system being applied by a computer game server to distribute computer gaming software. The embodiment provides a distribution model that thwarts users from copying and redistributing the computer gaming software without making significant changes to the computer gaming software.

The user 12 creates an account that allows him/her to rent one or more computer games for a few days. Thereafter, the user 12 downloads a client component to the client computer 14. The client component is used to download an encrypted user profile, one or more computer game software files, and one or more programs to decrypt and expire the files. The downloaded game files are encrypted with a key protected with a user identifier and a password. Thus, the downloaded game files cannot be opened without authentication by the user 12. Further, unauthorized copies of the downloaded game files cannot be reused without decryption.

The user 12 can use the downloaded computer game software files for a few days to assess their attractiveness. Thereafter, the user 12 may wish to purchase longer-term use of those of the computer game software files that he/she deems of interest.

Embodiments of the method and system can be used in many different practical applications, including but not limited to financial applications, government applications, education applications, entertainment applications, telecommunication applications, and software applications. Examples of financial applications include, but are not limited to, financial statement delivery, check image delivery, online billing and bill presentation, customer support, delivery of credit reports to customers, confidential merger and acquisition activities, and training for new online banking applications. Examples of government applications include, but are not limited to, confidential report distribution, identity verification information, confidential document delivery (e.g. federal application for student assistance, FAFSA, or tax filings), intelligence information sharing, and distribution of training for systems requiring a security clearance. Examples of education applications include, but are not limited to, performance and report card delivery, tests and quizzes, and collaboration-based work. Examples of entertainment applications include, but are not limited to, downloading and protecting entertainment content (e.g. movies, music, games or electronic books), and downloading and distributing exclusive content. Examples of telecommunication applications include, but are not limited to, delivery of bills to customers, delivery of software updates for Internet subscribers, call center operations such as delivery of supporting information, and credit checking and authorization. Examples of software applications include, but are not limited to, software distribution, distribution of software updates and/or patches, delivery of beta test software to select groups, and delivery of manuals and/or training materials.

Object delivery combined with management after delivery is a functionality that is useful in conjunction with various software modules and systems. Examples of the various software modules and systems include media production software and systems, secure email software and systems, and viewer security plug-ins or alternative security policy enforcement software and systems.

Some benefits of embodiments disclosed herein include: providing multiple authentication mechanisms, supporting potentially complex usage rules (e.g. not just timing out), supporting potentially complex account structures, including DRM elements to thwart use if a captured file is copied to a different device, allowing developers to embed rules and configurations with the downloader to adapt for various security models, enabling users to download a downloader with embedded rules including authentication before downloading an object, supporting multiple models and processes for downloading (from media files distribution to the distribution of secure reports or confidential customer information, and from one-time use to long-term subscription and permanent access), protecting objects and/or their components themselves rather than playback thereof through particular application programs, assigning rights to objects or their components prior to display in any program, using partial encryption to encrypt either portions or stripes of a file in order to enhance performance, including the downloader with the distribution in order to block repeat download actions, and making an encryption key, rules of use, and authentication available with a downloader and an object when the object is purchased or when authorization is obtained.

Figure 6:
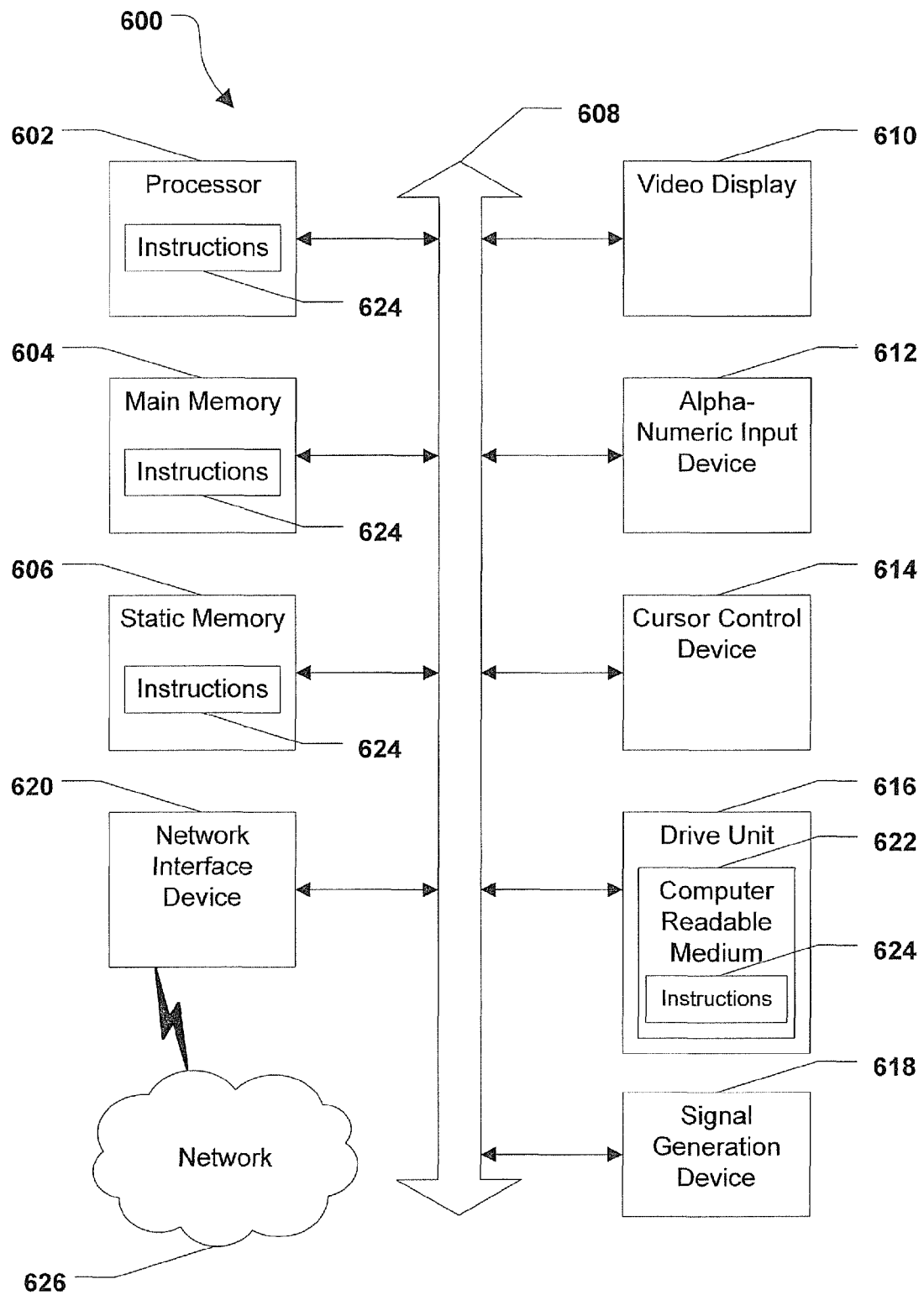
FIG. 6 is a block diagram of an illustrative embodiment of a general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606, that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term. "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. A system comprising:
a processor; and
a memory storing instructions that when executed by the processor cause the processor to perform operations, the operations comprising:

receiving, at a client computer configured to execute one or more applications, a first file and a second file from a server computer, wherein the first file is at least partially encrypted;

receiving, at the client computer from the server computer, a first file manager specific to the first file and a second file manager specific to the second file;

receiving user input at the client computer; and in response to the user input matching data stored in an encrypted user profile at the client computer, decrypting the first file using the first file manager based on a key stored in the encrypted user profile, wherein the first file manager selectively enables access, by the one or more applications, to the first file based on one or more first terms of usage, and wherein the second file manager selectively enables access, by the one or more applications, to the second file based on one or more second terms of usage.

2. The system of claim 1, wherein the operations further comprise receiving a first downloader at the client computer, wherein the first downloader is used by the client computer to receive the first file and the first file manager.

3. The system of claim 2, wherein the first file includes a first digital content item and the first downloader is unable to download files other than first files related to the first digital content item.

4. The system of claim 1, wherein the first file manager is configured to automatically delete the first file upon determining that usage of the first file is disallowed based on the one or more first terms of usage.

5. The system of claim 1, wherein the first file manager is configured to automatically terminate access to the first file upon determining that usage of the first file is disallowed based on the one or more first terms of usage.

6. The system of claim 1, wherein usage of the first file is disallowed based on a time stamp.

7. The system of claim 1, wherein the first file corresponds to a video game.

8. The system of claim 1, wherein the operations further include storing information related to usage of the first file at the client computer.

9. A client computer system comprising:
a processor; and
a memory storing instructions that when executed by the processor cause the processor to perform operations, the operations comprising:
receiving, at a client computer configured to execute one or more applications, a first file and a second file from a server computer, wherein the first file is at least partially encrypted;
receiving, at the client computer from the server computer, a first file manager specific to the first file and a second file manager specific to the second file;
receiving user input at the client computer; and
in response to the user input matching data stored in an encrypted user profile at the client computer, decrypting the first file using the first file manager based on a key stored in the encrypted user profile, wherein the first file manager selectively enables access, by the one or more applications, to the first file based on one or more first terms of usage, and wherein the second file manager selectively enables access, by the one or more applications, to the second file based on one or more second terms of usage.

10. The system of claim 9, further comprising receiving the encrypted user profile at the client computer.

11. The system of claim 9, wherein the first file manager is configured to automatically terminate access to the first file upon determining that usage of the first file is disallowed based on the one or more first terms of usage.

12. The system of claim 9, wherein the usage of the first file is disallowed when the usage of the first file has expired based on a time stamp.

13. The system of claim 9, wherein the usage of the first file is disallowed when a number of uses of the first file exceeds an allowed number of uses.

14. The system of claim 9, wherein the user input includes at least one of a user identifier, a passcode, and a biometric feature of a user.

15. A method comprising:
receiving, at a server computer, a request for a digital content item from a client computer;
outputting a downloader component from the server computer to the client computer, wherein the downloader component exclusively downloads files associated with the digital content item;
outputting a first file associated with the digital content item to the downloader component at the client computer, wherein the first file is at least partially encrypted; and
outputting a second file, a first file manager, a second file manager, and an encrypted user profile to the client computer, wherein the first file manager is configured to selectively enable access, by one or more applications executing at the client computer, to the first file and to decrypt the first file based on a key stored in the encrypted user profile in response to user input at the client computer matching data stored in the encrypted user profile, and wherein the second file manager is configured to selectively enable access, by the one or more applications executing at the client computer, to the second file based on one or more second terms of usage.

16. The method of claim 15, wherein the user input includes at least one of a user identifier, a passcode, and a biometric feature of a user.

17. The method of claim 15, wherein the first file manager is configured to automatically delete the first file upon determining that usage of the first file is disallowed based on one or more first terms of usage.

18. The method of claim 15, wherein the first file manager is configured to direct the first file to an application when usage of the first file is allowed.

19. The method of claim 15, wherein usage of the first file is disallowed based on a time stamp.

* * * * *